(12) United States Patent
Zeira

(10) Patent No.: US 7,672,360 B2
(45) Date of Patent: *Mar. 2, 2010

(54) CHANNEL ESTIMATION FOR TIME DIVISION DUPLEX COMMUNICATION SYSTEMS

(75) Inventor: Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/346,985

(22) Filed: Dec. 31, 2008

(65) Prior Publication Data

US 2009/0110037 A1    Apr. 30, 2009

Related U.S. Application Data

(63) Continuation of application No. 11/865,268, filed on Oct. 1, 2007, now Pat. No. 7,474,689, which is a continuation of application No. 11/491,463, filed on Jul. 21, 2006, now Pat. No. 7,280,584, which is a continuation of application No. 11/217,960, filed on Sep. 1, 2005, now Pat. No. 7,103,092, which is a continuation of application No. 09/755,400, filed on Jan. 5, 2001, now Pat. No. 6,985,513.

(60) Provisional application No. 60/175,167, filed on Jan. 7, 2000.

(51) Int. Cl.
*H04B 1/69* (2006.01)
*H04B 7/216* (2006.01)

(52) U.S. Cl. ....................... 375/147; 370/342

(58) Field of Classification Search .............. None
See application file for complete search history.

(56) References Cited

U.S. PATENT DOCUMENTS 5,970,060 A   10/1999   Baier et al.
6,535,554 B1   3/2003   Webster et al.

FOREIGN PATENT DOCUMENTS

CN   1163024   10/1997
EP   0480507 A   4/1992

(Continued)

OTHER PUBLICATIONS

"Channel Impulse Response Model", UMTS 30.03 version 3.2.0, TR 101 112, 1998, pp. 42-43 and 65-66.

(Continued)

*Primary Examiner*—Tesfaldet Bocure
(74) *Attorney, Agent, or Firm*—Volpe and Koenig, P.C.

(57) ABSTRACT

A plurality of communication bursts are used to communicate data in a shared spectrum in a time slot of a time division duplex communication system. Each burst has an associated midamble sequence of a set of known sequences. A wireless communication apparatus has a receiver component configured to receive the plurality of communication bursts and to define a received vector corresponding to the received bursts. A channel estimator is provided that is configured to estimate channel information of the plurality of communication bursts by constructing a block matrix having a plurality of identical right circulant matrix blocks using the known midamble sequences and the received vector. A data detector then recovers data from the received communication bursts using the estimated wireless channel information.

20 Claims, 3 Drawing Sheets

FOREIGN PATENT DOCUMENTS

| | | |
|---|---|---|
| WO | 99/59351 | 11/1999 |
| WO | 01/52489 | 7/2001 |

OTHER PUBLICATIONS

3$^{rd}$ Generation Partnership Project; Technical Specification Group Radio Access Networks; UTRA (UE) TDD; Radio Transmission and Reception 3G TS 25.102 V3.3.0 Release 1999, p. 37.

3$^{rd}$ Generation Partnership Project; Technical Specification Group Radio Access Network; Physical Channels and Mapping of Transport Channels onto Physical Channels (TDD), 3G TS 25.221 V3.2.0, Mar. 2000, pp. 3-10.

Benvenuto et al., "Joint Detection with Low Computational Complexity for Hybrid TD-CDMA Systems", IEEE, 2000, pp. 245-253.

Caire et al., "Training Sequence Design for Adaptive Equalization of Multi-User Systems," Asilomar Conference on Signals, Systems and Computers, XP 010324369, vol. 2, pp. 1479-1483 (Nov. 1998).

Cho et al., "Analysis of an Adaptive SIC for Near-Far Resistant DS-CDMA", IEEE Transactions on Communications, vol. 46, No. 11, Nov. 1998, pp. 1429-1432.

Hui et al., "Successive Interference Cancellation for Multiuser Asynchronous DS/CDMA Detectors in Multipath Fading Links", IEEE Transactions on Communications, vol. 46, No. 3, Mar. 1998, pp. 384-391.

Karimi et al., "A Novel and Efficient Solution to Block-Based Joint-Detection Using Approximate Cholesky Factorization", Ninth IEEE International Symposium, vol. 3, Sep. 8-11, 1998, pp. 1340-1345.

Klein et al., "Linear Unbiased Data Estimation in Mobile Radio Systems Applying to CDMA", IEEE Journal on Selected Areas in Communications, vol. 11, No. 7, Sep. 1993, pp. 1058-1065.

Klein et al., "Zero Forcing and Minimum Mean-Square-Error Equalization for Multiuser Detection in Code-Division Multiple-Access Channels", IEEE Transactions on Vehicular Technology, vol. 45, No. 2, May 1996, pp. 276-287.

Lee et al. "A Fast Computation Algorithm For the Decision Feedback Equalizer." IEEE Transactions on Communications, vol. 43, No. 11, Nov. 1995, pp. 2742-2749.

Liu, "Performance of Joint Data and Channel Estimation Using Tap variable Step-Size (TVSS) LMS for Multipath Fast Fading Channel", Proceedings of the Global Telecommunications Conference (GLOBECOM), Nov. 28, 1994, pp, 973-978.

Malard et al., "Efficiency and Scalability of Two Parallel QR Factorization Algorithms", Proceedings of the Scalable High-Performance Computing Conference (Cat. No. 94TH0637-9), Proceedings of the IEEE Scalable High Performance Computing Conference, Knoxville, TN, May 23-25, 1994, pp. 615-622.

Marple, *Digital Spectral Analysis With Applications*, "Chapter 3, Section 3.4 Matrix Inverses", Prentice-Hall, Inc., pp. 67-69, (1987).

Oon et al., "Performance of an Adaptive Successive Serial-Parallel CDMA Cancellation Scheme in Flat Rayleigh Fading Channels", IEEE Transactions on Vehicular Technology, vol. 49, No. 1, Jan. 2000, pp. 130-147.

Pan et al., "Low Complexity Data Detection Using Fast Fourier Transform Decomposition of Channel Correlation Matrix", 2001, IEEE, pp. 1322-1326.

Patel et al., "Analysis of a Simple Successive Interference Cancellation Scheme in a DS/CDMA System", IEEE Journal on Selected Areas in Communications, vol. 12, No. 5, Jun. 1994, pp. 796-807.

Rasmussen et al., "A Matrix-Algebraic Approach to Successive Interference Cancellation in CDMA", IEEE Transactions on Communications, vol. 48, No. 1, Jan. 2000, pp. 145-151.

Steiner et al., "Optimum and Suboptimum Channel Estimation for the Uplink of CDMA Mobile Radio Systems with Joint Detection", European Transactions on Telecommunications and Related Technologies, IT, AEI, Milano, vol. 5, No. 1, 1994; pp. 39-50.

Steiner et al., "Uplink Channel Estimation In Synchronous CDMA Mobile Radio Systems With Joint Detection", The Fourth International Symposium On Personal, Indoor And Mobile Radio Communications, (Yokohama, Japan, 1993).

Vollmer et al., "Joint Detection Using Fast Fourier Transforms in TD-CDMA based Mobile Radio Systems," Proceedings f the International Conference on Telecommunications, XP002190679, pp. 1-7 (1999).

50 — Construct a model of the received midamble sequence data, $\bar{r}$, the channel response, $\bar{h}$, and the known midamble codes, such as $$\left[\sum_{k=1}^{K} M^{(k)}\right] \bar{h} = \bar{r}$$

52 — Reconfigure the model by replacing the known midamble codes with K right circulant matrix blocks, B, such as $$\left[\sum_{k=1}^{K} M^{(k)}\right] = \begin{bmatrix} B \\ B \\ \vdots \\ B \end{bmatrix}$$

54 — Solve the reconfigure model using a least squares solution, such as by a discrete Fourier transform or a single cyclic correlator solution

Fig. 4

CHANNEL ESTIMATION FOR TIME DIVISION DUPLEX COMMUNICATION SYSTEMS

This application is a continuation of U.S. patent application Ser. No. 11/865,268, filed Oct. 1, 2007, now U.S. Pat. No. 7,474,689 which issued on Jan. 6, 2009, which is a continuation of U.S. patent application Ser. No. 11/491,463, filed Jul. 21, 2006, now U.S. Pat. No. 7,280,584 which issued on Oct. 9, 2007, which is a continuation U.S. patent application Ser. No. 11/217,960, filed Sep. 1, 2005, now U.S. Pat. No. 7,103,092 which issued on Sep. 5, 2006, which is a continuation of U.S. patent application Ser. No. 09/755,400, filed on Jan. 5, 2001, now U.S. Pat. No. 6,985,513 which issued on Jan. 10, 2006, which claims priority from U.S. Provisional Patent Application No. 60/175,167, filed on Jan. 7, 2000; all of which are incorporated by reference herein.

BACKGROUND

The invention generally relates to wireless communication systems. In particular, the invention relates to channel estimation in a wireless communication system.

FIG. 1 is an illustration of a wireless communication system 10. The communication system 10 has base stations $12_1$ to $12_5$ which communicate with user equipments (UEs) $14_1$ to $14_3$. Each base station $12_1$ has an associated operational area where it communicates with UEs $14_1$ to $14_3$ in its operational area.

In some communication systems, such as code division multiple access (CDMA) and time division duplex using code division multiple access (TDD/CDMA), multiple communications are sent over the same frequency spectrum. These communications are typically differentiated by their chip code sequences. To more efficiently use the frequency spectrum, TDD/CDMA communication systems use repeating frames divided into time slots for communication. A communication sent in such a system will have one or multiple associated chip codes and time slots assigned to it based on the communication's bandwidth.

Since multiple communications may be sent in the same frequency spectrum and at the same time, a receiver in such a system must distinguish between the multiple communications. One approach to detecting such signals is single user detection. In single user detection, a receiver detects only the communications from a desired transmitter using a code associated with the desired transmitter, and treats signals of other transmitters as interference. Another approach is referred to as joint detection. In joint detection, multiple communications are detected simultaneously.

To utilize these detection techniques, it is desirable to have an estimation of the wireless channel in which each communication travels. In a typical TDD system, the channel estimation is performed using midamble sequences in communication bursts.

A typical communication burst 16 has a midamble 20, a guard period 18 and two data bursts 22, 24, as shown in FIG. 2. The midamble 20 separates the two data bursts 22, 24 and the guard period 18 separates the communication bursts 16 to allow for the difference in arrival times of bursts 16 transmitted from different transmitters. The two data bursts 22, 24 contain the communication burst's data. The midamble 20 contains a training sequence for use in channel estimation.

After a receiver receives a communication burst 16, it estimates the channel using the received midamble sequence. When a receiver receives multiple bursts 16 in a time slot, it typically estimates the channel for each burst 16. One approach for such channel estimation for communication bursts 16 sent through multiple channels is a Steiner Channel Estimator. Steiner Channel Estimation is typically used for uplink communications from multiple UEs, $14_1$ to $14_3$, where the channel estimator needs to estimate multiple channels.

In some situations, multiple bursts 16 experience the same wireless channel. One case is a high data rate service, such as a 2 megabits per second (Mbps) service. In such a system, a transmitter may transmit multiple bursts in a single time slot. Steiner estimation can be applied in such a case by averaging the estimated channel responses from all the bursts 16. However, this approach has a high complexity. Accordingly, it is desirable to have alternate approaches to channel estimation.

SUMMARY

A plurality of communication bursts are used to communicate data in a shared spectrum in a time slot of a time division duplex communication system. Each burst has an associated midamble sequence of a set of known sequences. A wireless communication apparatus has a receiver component configured to receive the plurality of communication bursts and to define a received vector corresponding to the received bursts. A channel estimator is provided that is configured to estimate channel information of the plurality of communication bursts by constructing a block matrix having a plurality of identical right circulant matrix blocks using the known midamble sequences and the received vector. Preferably, the number of blocks in the block matrix corresponds to the number of communication bursts. A data detector then recovers data from the received communication bursts using the estimated wireless channel information.

BRIEF DESCRIPTION OF THE DRAWINGS

FIG. 4 is a flow chart of multiburst channel estimation.

DETAILED DESCRIPTION OF THE PREFERRED EMBODIMENTS

Figure 1:
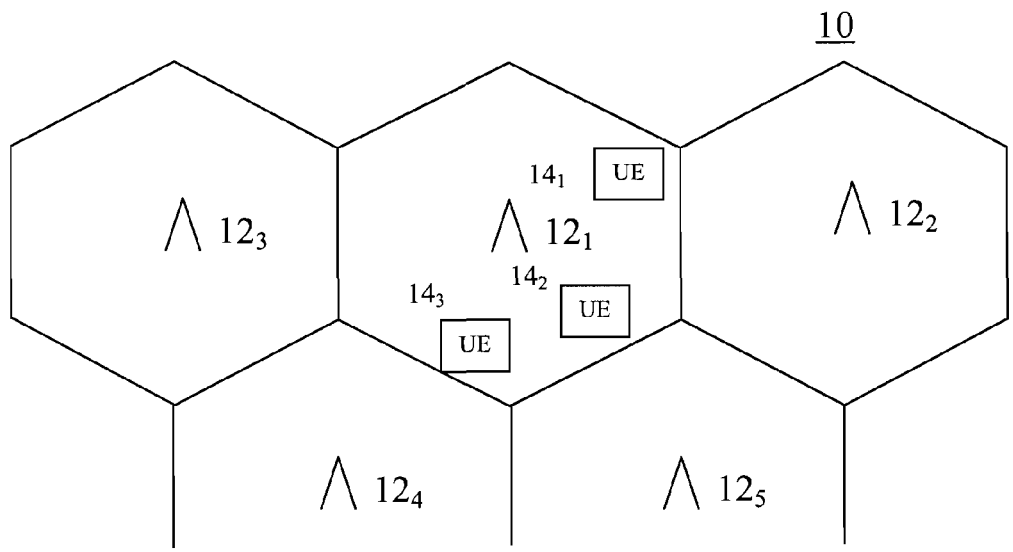
FIG. 1 is a wireless communication system.
Figure 2:
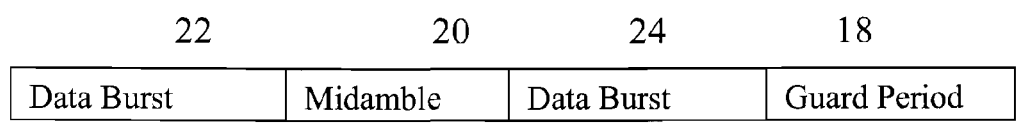
FIG. 2 is an illustration of a communication burst.
Figure 3:
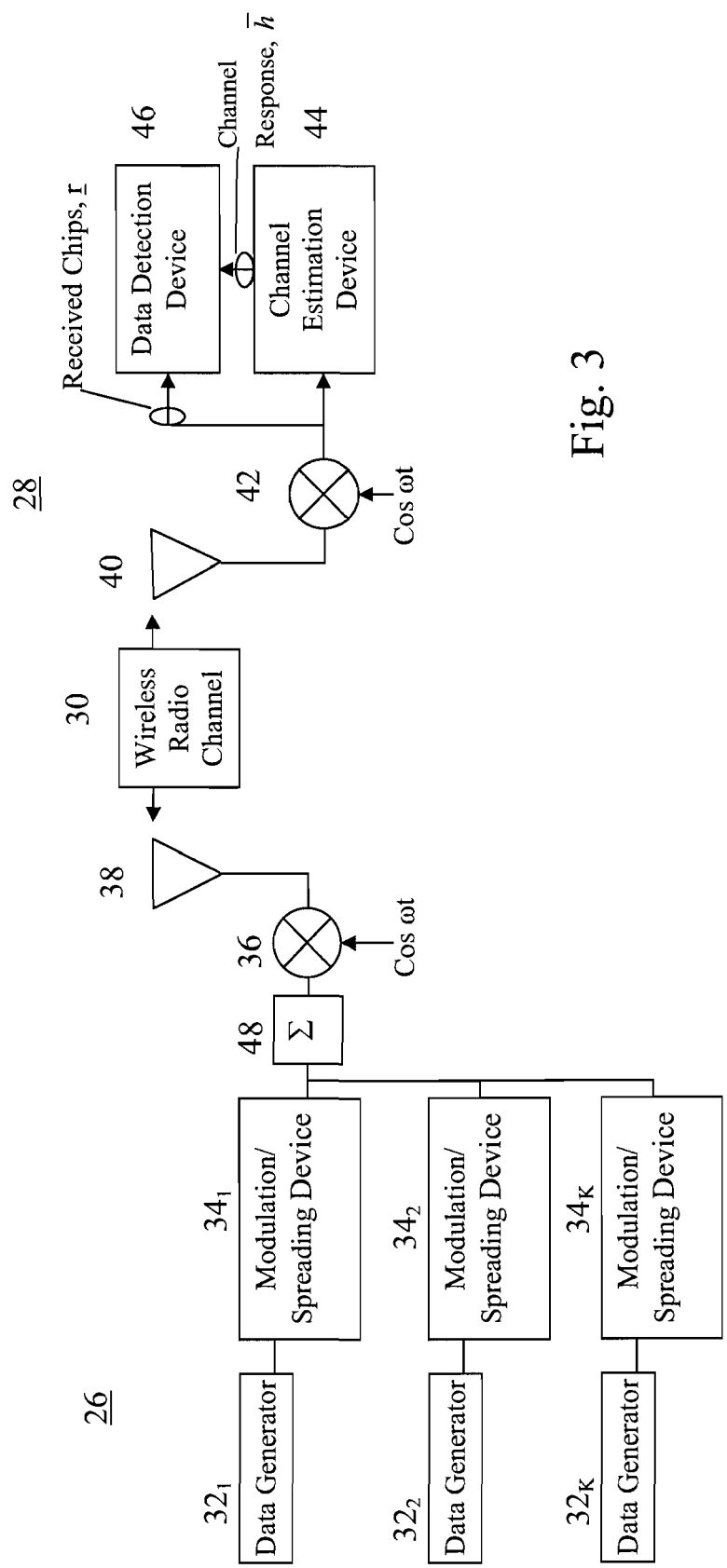
FIG. 3 is a simplified multiburst transmitter and receiver.

FIG. 3 illustrates a simplified multicode transmitter 26 and receiver 28 in a TDD/CDMA communication system. In a preferred application, such as a 2 Mbps downlink service, the receiver 28 is in a UE $14_1$ and the transmitter 26 is in a base station $12_1$, although the receiver 28 and transmitter 26 may be used in other applications.

The transmitter 26 sends data over a wireless radio channel 30. The data is sent in K communication bursts. Data generators $32_1$ to $32_K$ in the transmitter 26 generate data to be communicated to the receiver 28. Modulation/spreading and training sequence insertion devices $34_1$ to $34_K$ spread the data and make the spread reference data time-multiplexed with a midamble training sequence in the appropriate assigned time slot and codes for spreading the data, producing the K communication bursts. Typical values of K for a base station $12_1$ transmitting downlink bursts are from 1 to 16. The communication bursts are combined by a combiner 48 and modulated by a modulator 36 to radio frequency (RF). An antenna 38 radiates the RF signal through the wireless radio channel 30 to an antenna 40 of the receiver 28. The type of modulation used for the transmitted communication can be any of those known to those skilled in the art, such as binary phase shift keying (BPSK) or quadrature phase shift keying (QPSK).

The antenna 40 of the receiver 28 receives various radio frequency signals. The received signals are demodulated by a demodulator 42 to produce a baseband signal. The baseband signal is processed, such as by a channel estimation device 44 and a data detection device 46, in the time slot and with the appropriate codes assigned to the transmitted communication bursts. The data detection device 46 may be a multiuser detector or a single user detector. The channel estimation device 44 uses the midamble training sequence component in the baseband signal to provide channel information, such as channel impulse responses. The channel information is used by the data detection device 46 to estimate the transmitted data of the received communication bursts as hard symbols.

To illustrate one implementation of multiburst channel estimation, the following midamble type is used, although multiburst channel estimation is applicable to other midamble types. The K midamble codes, $m^{(k)}$ where $k=1 \ldots K$, are derived as time shifted versions of a periodic single basic midamble code, $m_P$, of period P chips. The length of each midamble code is $L_m = P+W-1$. W is the length of the user channel impulse response. Typical values for $L_m$ are 256 and 512 chips. Although the following discussion is based on each burst having a different midamble code, some midambles may have the same code. As a result, the analysis is based on N midamble codes, N<K. Additionally, the system may have a maximum number of acceptable midamble codes N. The receiver 28 in such a system may estimate the channel for the N maximum number of codes, even if less than N codes are transmitted.

The elements of $m_P$ take values from the integer set $\{1, -1\}$. The sequence $m_P$ is first converted to a complex sequence $\tilde{m}_P[i] = j^i \cdot m_P[i]$, where $i=1 \ldots P$. The $m^{(k)}$ are obtained by picking K sub-sequences of length $L_m$ from a 2 P long sequence formed by concatenating two periods of $\tilde{m}_P$. The $i^{th}$ element of $m^{(k)}$ is related to $\tilde{m}_P$ by Equation 1.

$$m_i^{(k)} = \tilde{m}_P\left[\begin{array}{c}(K-k)\\W+i\end{array}\right], \quad \text{for } 1 \leq i \leq P-(K-k)W$$
$$= \tilde{m}_P\left[\begin{array}{c}i-P+\\(K-k)W\end{array}\right], \quad \text{for } P-(K-k)W \leq i \leq P+W-1$$

Equation 1

Thus, the starting point of $m^{(k)}$, $k=1 \ldots K$ shifts to the right by W chips as k increases from 1 to K.

The combined received midamble sequences are a superposition of the K convolutions. The $k^{th}$ convolution represents the convolution of $m^{(k)}$ with $h^{(k)}$. $h^{(k)}$ is the channel response of the $k^{th}$ user. The preceding data field in the burst corrupts the first (W−1) chips of the received midamble. Hence, for the purpose of channel estimation, only the last P of $L_m$ chips are used to estimate the channel.

Multiburst channel estimation will be explained in conjunction with the flow chart of FIG. 4. To solve for the individual channel responses $h^{(k)}$, Equation 2 is used.

$$\begin{bmatrix} m_P & \cdots & m_{(K-1)W+1} & m_{(K-1)W} & \cdots & m_{(K-2)W+1} & & m_W & \cdots & m_1 \\ m_1 & \cdots & m_{(K-1)W+2} & m_{(K-1)W+1} & \cdots & m_{(K-2)W+2} & & m_{W+1} & \cdots & m_2 \\ m_2 & \cdots & m_{(K-1)W+3} & m_{(K-1)W+2} & \cdots & m_{(K-2)W+3} & \cdots & m_{W+2} & \cdots & m_3 \\ \vdots & \vdots & \vdots & \vdots & \vdots & \vdots & & \vdots & \vdots & \vdots \\ m_{KW-1} & \vdots & m_{(K-1)W} & m_{(K-1)W-1} & \cdots & m_{(K-2)W} & & m_{W-1} & & m_P \end{bmatrix} \times \begin{bmatrix} \underline{h}^{(1)} \\ \underline{h}^{(2)} \\ \vdots \\ \underline{h}^{(K)} \end{bmatrix} = \begin{bmatrix} r_W \\ r_{W+1} \\ r_{W+2} \\ \vdots \\ r_{L_m} \end{bmatrix}$$

Equation 2

$r_W \ldots r_{LM}$ are the received combined chips of the midamble sequences. The m values are the elements of $m_P$.

Equation 2 may also be rewritten in shorthand as Equation 3.

$$\sum_{k=1}^{K} M^{(k)} \overline{h^{(k)}} = \overline{r}$$

Equation 3

Each $M^{(k)}$ is a KW-by-W matrix. $\overline{r}$ are the received midamble chip responses. When all the bursts travel through the same channel, $\overline{h^{(1)}} \ldots \overline{h^{(k)}}$ can be replaced by $\overline{h}$ as in Equation 4, 50.

$$\left[\sum_{k=1}^{K} M^{(k)}\right] \overline{h} = \overline{r}$$

Equation 4

G is defined as per Equation 5.

$$G = [M^{(1)}, \ldots, M^{(k)}, \ldots, M^{(K)}]$$

Equation 5

As a result, G is a KW-by-KW matrix. Since G is a right circulant matrix, Equation 4 can be rewritten using K identical right circulant matrix blocks B, as per Equation 6, 52.

$$\left[\sum_{k=1}^{K} M^{(k)}\right] = \begin{bmatrix} B \\ B \\ \vdots \\ B \end{bmatrix} = D$$

Equation 6

B is a W-by-W right circulant matrix. The number of B-blocks is K. Using Equation 6, Equation 4 can be rewritten as Equation 7.

$$D\overline{h} = \overline{r}$$

Equation 7

Equation 7 describes an over-determined system with dimensions KW-by-W. One approach to solve Equation 7 is a least squares solution, 54. The least squares solution of Equation 7 is given by Equation 8.

$$\bar{h} = (D^H D)^{-1} D^H \bar{r} \qquad \text{Equation 8}$$

$D^H$ is the Hermitian of D.

Applying Equation 6 to Equation 8 results in Equation 9.

$$(D^H D)^{-1} = \frac{1}{K}(B^H B)^{-1} \qquad \text{Equation 9}$$

The received vector $\bar{r}$ of dimension KW can be decomposed as per Equation 10.

$$\bar{r} = \begin{bmatrix} \bar{r_1} \\ \bar{r_2} \\ \vdots \\ \bar{r_k} \end{bmatrix} \qquad \text{Equation 10}$$

The dimension of $\bar{r}_k$ is W. Substituting Equations 9 and 10 into Equation 8, the least-squares solution for the channel coefficients per Equation 11 results.

$$\hat{\bar{h}} = (B^H B)^{-1} B^H \left( \frac{1}{K} \sum_{k=1}^{K} \bar{r}_k \right) = (B^H B)^{-1} B^H \bar{\bar{r}}_k \qquad \text{Equation 11}$$

$\bar{\bar{r}}_k$ represents the average of the segments of $\bar{r}$. Since B is a square matrix, Equation 11 becomes Equation 12.

$$\bar{h} = B^{-1} \bar{\bar{r}}_k \qquad \text{Equation 12}$$

Since B is a right circulant matrix and the inverse of a right circulant matrix is also right circulant, the channel estimator can be implemented by a single cyclic correlate, or by a discrete Fourier transform (DFT) solution.

A W point DFT method is as follows. Since B is right circulant, Equation 13 can be used.

$$B = D_W^{-1} \cdot \Lambda_C \cdot D_W \qquad \text{Equation 13}$$

$D_W$ is the W point DFT matrix as per Equation 14.

$$D_W = \begin{bmatrix} \tilde{W}^0 & \tilde{W}^0 & \tilde{W}^0 & \tilde{W}^0 & \cdots & \tilde{W}^0 \\ \tilde{W}^0 & \tilde{W}^1 & \tilde{W}^2 & \tilde{W}^3 & \cdots & \tilde{W}^{(W-1)} \\ \tilde{W}^0 & \tilde{W}^2 & \tilde{W}^4 & \tilde{W}^6 & \cdots & \tilde{W}^{2(W-1)} \\ \tilde{W}^0 & \tilde{W}^3 & \tilde{W}^6 & \tilde{W}^9 & \cdots & \tilde{W}^{3(W-1)} \\ \vdots & \vdots & \vdots & \vdots & \cdots & \vdots \\ \tilde{W}^0 & \tilde{W}^{(W-1)} & \tilde{W}^{2(W-1)} & \tilde{W}^{3(W-1)} & \cdots & \tilde{W}^{(W-1)(W-1)} \end{bmatrix} \qquad \text{Equation 14}$$

$\Lambda_C$ is a diagonal matrix whose main diagonal is the DFT of the first column of B, as per Equation 15.

$$\Lambda_C = \text{diag}(D_W(B(:,1))) \qquad \text{Equation 15}$$

$$\tilde{W} = e^{-j\frac{2\pi}{W}}.$$

Thus, $D_W$ is the DFT operator so that $D_W x$ represents the W point DFT of the vector x. By substituting Equation 13 into Equation 12 and using results in Equation 16.

$$D_W^{-1} = \frac{D_W^*}{W}, \quad \bar{h} = \left( D_W^* \cdot \frac{1}{W} \cdot \Lambda_C^{-1} \cdot D_W \right) \bar{r} \qquad \text{Equation 16}$$

$D_W^*$ is the element-by-element complex conjugate of $D_W$.

Alternately, an equivalent form that expresses $\bar{h}$ in terms of $\Lambda_R$ instead of $\Lambda_C$ can be derived. $\Lambda_R$ is a diagonal matrix whose main diagonal is the DFT of the first row of B per Equation 17.

$$\Lambda_R = \text{diag}(D_W(B(:,1))) \qquad \text{Equation 17}$$

Since the transpose of B, $B^T$, is also right circulant and that its first column is the first row of B, $B^T$ can be expressed by Equation 18.

$$B^T = D_W^{-1} \cdot \Lambda_R \cdot D_W \qquad \text{Equation 18}$$

Using Equation 18 and that $D_W^T = D_W, \Lambda_R^T = \Lambda_R$ and that for any invertible matrix A, $(A^T)^{-1} = (A^{-1})^T$, B can be expressed as per Equation 19.

$$B = D_W \cdot \Lambda_R \cdot D_W^{-1} \qquad \text{Equation 19}$$

Substituting Equation 19 into Equation 12 and that $$D_W^{-1} = \frac{D_W^*}{W}$$

results in Equation 20.

$$\bar{h} = \left( D_W \cdot \Lambda_R^{-1} \cdot \frac{1}{W} D_W^* \right) \bar{r} \qquad \text{Equation 20}$$

Equations 16 or 20 can be used to solve for $\bar{h}$. Since all DFTs are of length W, the complexity in solving the equations is dramatically reduced.

An approach using a single cyclic correlator is as follows. Since $B^{-1}$ is the inverse of a right circulant matrix, it can be written as Equation 21.

$$B^{-1} = T = \begin{bmatrix} T_1 & T_W & \cdots & T_3 & T_2 \\ T_2 & T_1 & \cdots & T_4 & T_3 \\ \vdots & \vdots & \cdots & \vdots & \vdots \\ T_{W-1} & T_{W-2} & \cdots & T_1 & T_W \\ T_W & T_{W-1} & \cdots & T_2 & T_1 \end{bmatrix} \qquad \text{Equation 21}$$

The first row of the matrix T is equal to the inverse DFT of the main diagonal of $\Lambda_R^{-1}$. Thus, the matrix T is completely determined by $\Lambda_R^{-1}$.

The taps of the channel response $\bar{h}$ are obtained successively by an inner product of successive rows of T with the average of W-length segments of the received vector $\bar{r}$. The successive rows of T are circularly right shifted versions of the previous row. Using registers to generate the inner product, the first register holds the averaged segments of $\bar{r}$, and the second register is a shift register that holds the first row of the matrix T. The second register is circularly shifted at a certain clock rate. At each cycle of the clock, a new element of $\bar{h}$ is determined by the inner product of the vectors stored in the two registers. It is advantageous to shift the first row of the matrix T rather than the received midambles. As a result, no extra storage is required for the midambles. The midambles continue to reside in the received buffer that holds the entire burst. Since the correlator length is only W, a significant reduction in complexity of estimating the channel is achieved.

What is claimed is:

1. A wireless communication apparatus comprising:
a receiver component configured to receive wireless signals containing a plurality of communication bursts, each burst having an associated midamble sequence, and to define a received vector corresponding to the received bursts;
a channel estimator configured to estimate channel information of the plurality of communication bursts by constructing a block matrix having a plurality of identical right circulant matrix blocks using the midamble sequences and the received vector; and
a data detector configured to recover data from the communication bursts using the estimated wireless channel information.

2. The wireless communication apparatus of claim 1 wherein the receiver component is configured to receive wireless signals containing communication bursts in a code division multiple access format and the data detector is a multiuser detector.

3. The wireless communication apparatus of claim 1 wherein the receiver component is configured to receive wireless signals containing communication bursts in a code division multiple access format and the data detector is a single user detector.

4. The wireless communication apparatus of claim 1 wherein the receiver component is configured to receive wireless signals containing communication bursts in a code division multiple access format and the channel estimator is configured to estimate channel information of the plurality of communication bursts by constructing the block matrix having a plurality of identical right circulant matrix blocks equal in number to the plurality of bursts.

5. The wireless communication apparatus of claim 1 wherein the receiver component is configured to receive wireless signals containing communication bursts in a code division multiple access format and the channel estimator is configured to estimate channel impulse responses of the plurality of communication bursts as the channel information.

6. The wireless communication apparatus of claim 1 wherein the receiver component is configured to receive wireless signals containing communication bursts in a code division multiple access format and the channel estimator is configured to estimate channel information using a least squares solution.

7. The wireless communication apparatus of claim 6 wherein the channel estimator is configured to estimate channel information using a least squares solution using a discrete Fourier transform solution.

8. The wireless communication apparatus of claim 6 wherein the channel estimator is configured to estimate channel information using a least squares solution using a single cyclic correlator.

9. The wireless communication apparatus of claim 1 wherein the receiver component is configured to receive wireless signals containing communication bursts in a code division multiple access format where each burst has an associated midamble sequence that is either a basic midamble code or a time shifted version of the basic midamble code.

10. The wireless communication apparatus of claim 1 configured as a user equipment to receive wireless signals containing communication bursts from a base station.

11. A method for a wireless communication apparatus comprising:
receiving a wireless signal containing a plurality of communication bursts, each burst having an associated midamble sequence, and defining a received vector corresponding to the received bursts;
estimating channel information of the plurality of communication bursts by constructing a block matrix having a plurality of identical right circulant matrix blocks using the midamble sequences and the received vector; and
recovering data from the received communication bursts using the estimated wireless channel information.

12. The method of claim 11 wherein the received wireless signal contains communication bursts in a code division multiple access format and the recovering data is performed using a multiuser detector.

13. The method of claim 11 wherein the received wireless signal contains communication bursts in a code division multiple access format and the recovering data is performed using a single user detector.

14. The method of claim 11 wherein the received wireless signal contains communication bursts in a code division multiple access format and the estimating channel information of the plurality of communication bursts is by constructing the block matrix having a plurality of identical right circulant matrix blocks equal in number to the plurality of bursts.

15. The method of claim 11 wherein the received wireless signal contains communication bursts in a code division multiple access format and the estimating channel information is by estimating channel impulse responses of the plurality of communication bursts.

16. The method of claim 11 wherein the received wireless signal contains communication bursts in a code division multiple access format and estimating channel information uses a least squares solution.

17. The method of claim 16 wherein the estimating channel information is by using a least squares solution using a discrete Fourier transform solution.

18. The method of claim 16 wherein the estimating channel information using a least squares solution is performed by using a single cyclic correlator.

19. The method of claim 11 wherein the received wireless signal contains communication bursts in a code division multiple access format where each burst has an associated midamble sequence that is either a basic midamble code or a time shifted version of the basic midamble code.

20. The method of claim 19 performed by a user equipment to receive communication bursts from a base station of a wireless communication system.

* * * * *